Jan. 31, 1950

H. P. RIVET 2,495,770

LEMON SLICING DEVICE

Filed Dec. 13, 1947

INVENTOR.
HENRY PHILIP RIVET
BY
Zoltan A. Polachek
ATTORNEY

Patented Jan. 31, 1950

2,495,770

UNITED STATES PATENT OFFICE 2,495,770

LEMON SLICING DEVICE

Henry Philip Rivet, New York, N. Y.

Application December 13, 1947, Serial No. 791,508

1 Claim. (Cl. 146—169)

This invention relates to new and useful improvements in appliances for use in the kitchen and like places, and, more particularly, aims to provide a novel and valuable such appliance in the form of a lemon divider or slicer.

An object of the invention is to provide a relatively simple, highly practical, and rugged and reliable slicer for the purpose stated, and one capable of being efficiently used for slicing a lemon longitudinally thereof along lines radial to the center line of the lemon, thereby at one operation to produce a desired number of longitudinal lemon slices, such as eight thereof, without squeezing the lemon and thereby robbing it of its juice.

According to the invention, there is provided a device of the kind indicated, whether for slicing a lemon or for dividing any fruit article, which operates as above, which includes an operating mechanism including a manual actuator arranged to effect the entirety of the slicing operation relative to a fruit article as an accompaniment to a single downswing of said actuator in a single direction, and wherein said fruit article, hereinafter referred to as a lemon, is manually placed upright in a seat provided by the upper cutting edges of a collection of knife elements, and the slicing operation is performed by downward movement of a piston-like part for forcing the lemon down past said knife elements thereby to cause drop of the several lemon slices below the knives.

Another feature of the invention is a swingable mounting of said piston-like part, together with resiliently acting means for normally aligning said part with the part carrying the knife elements and for acting to adapt the piston-like part for a centering action on the lemon just prior to the commencement of the cutting operation; such swing-mount of the piston-like part permitting the same to be preparatorily temporarily manually swung out of the way to allow room for easy seating of the lemon on the knives, which arrangement makes it possible to reduce very considerably the over-all height of the appliance.

Various other features and advantages of the invention will be pointed out or become apparent hereinafter.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Fig. 1 shows side elevationally an embodiment of the invention as now favored; this view being partially broken away, to show the part carrying the knife elements (this part below called the cutter cup) in axial section and a lemon seated therein, and to show in axial section the lower portion of the piston-like part (this part below called the piston).

Fig. 2 is a rear elevational view of the upper portion of the appliance.

Fig. 3 is a horizontal section, taken on the line 3—3 of Fig. 1, with certain lower parts omitted.

Fig. 4 is a top plan view of the cutter cup, with the lemon of Fig. 1 removed.

Fig. 5 is a bottom plan view of the piston.

Fig. 6 is a detail view in perspective, showing a bracket.

Referring to the drawing more in detail, the appliance illustrated comprises a main casting 10 incorporating a base portion 11, here shown, for example, as including a bracket 12 having a clamp-screw 14 whereby the appliance may be firmly secured to a table top 15 or the like. Casting 10 above its said base portion also includes a cylindrical extension providing a cutter cup 16 and thereabove a post 17 U-shaped in cross-section. The post thus provides a vertical trackway for an up and down movable rack 18; such trackway extending from the top of the post straight down along the same to the point indicated at 19 in Fig. 1.

The rack 18 is slidably retained in said trackway by the meshing therewith of a spur gear 20, the mounting and functioning of which will be later explained, and by a pin and slot connection between the rack and the post 17 comprising a slot 21 along the post and a headed pin 22 the shank of which passes through said slot and is entered into and secured to the rear side of the rack near the lower end thereof.

By means of a bracket 23, secured as at 24 to the sides of the rack 18 also near the lower end thereof, the cylindrical piston 25 is pivotally hung at 26; the piston being normally yieldably held with its axis vertical by abutment of its top against a cross-bar portion 23ª of the bracket 23 due to the pull of a pair of retractile springs 27 each connected at its upper end to the bracket and at its lower end to a pin 28 at a side of the piston.

Before further considering the piston 25, which is downwardly advanceable toward the cutter cup 16 and through the latter until the bottom of the piston arrives at the position indicated in dot and dash lines at 25', it is to be noted that the lemon illustrated at 29 as seated in said cup rests on eight uniformly spaced and radially extending knives 30 suitably connected at their meeting ends and suitably anchored at their outer ends in the cup 16; these knives having their upper cutting edges curvilinearly extended to provide a skeletal seat conforming to the end rotundity of the bottom of the lemon.

Reverting now to the piston 25, this, vertically centrally aligned by action of the springs 27 with the cutter cup 16, is of a diameter slightly less than the inside diameter of said cup; and in order to allow said piston to pass the knives 30, the piston is provided with eight radially arranged slots 31 for clearing the knives when the piston travels down to its lowermost position 25'.

The slots 31 at their outer ends terminate at the periphery of the piston 25, their outer ends are high enough up on the piston to clear the outer flat end portions of the tops of the knives 30, and their lower ends terminate at the superficies of an upwardly extended recess 32 in the bottom of the piston conforming to the end rotundity of the top of the lemon.

Said recess has a central reduced upper extensions 33 for receiving the teat 29ᵃ of the lemon and thereby centering the latter at the instant the piston during its descent begins to push the lemon endwisely down past the knives 30— at the conclusion of which operation, that is, when the bottom of the piston reaches the aforesaid position 25', the eight lemon slices have dropped through the open bottom of the cutter cup to fall gently on the table top 15.

The lemon centering action just referred to is facilitated by the presence of the springs 27 which when necessary allow slight temporary sway of the piston as the recess 32 engages the lemon in first beginning to envelop the upper end of the latter, especially where the lemon happens to be somewhat under normal size in diameter. However, for absolutely insuring proper passage of the piston 25 through the cutter cup 16, the upper circumferential edge of the latter is shown as laterally upwardly and outwardly tapered, and the lower circumferential edge of the piston is shown as matchingly tapered.

Said springs 27, together with the pivotal mounting of the piston 25, serve in another important relation, that is, for permitting the piston 25 to be swung to its position 25" indicated in dot and dash lines, to allow easy and convenient seating of a lemon in the cup 16; despite the fact that the limit of upward travel of the piston is as shown in full lines in Fig. 1, thereby to reduce the over-all height of the appliance. For facilitating such temporary relocation of the piston 25, the same is shown as carrying an offset arm 34 to provide a lifting finger-piece.

The means for operating the appliance includes a hand-lever 35, fixed to a short shaft 36 journalled at its opposite ends in a bracket 37 secured to the post 17 as at 38, a spur gear 39 also fixed on the shaft 36, a spur pinion 40 meshing with the gear 39 and fixed to a short shaft 41 also journalled at its opposite ends in the bracket 37, and, also fixed on the shaft 41, the aforesaid spur gear 20 meshing with the rack 18.

On depression of the hand-lever 35, through a comparatively small angle, the rack 18 descends, by a quickly performed movement with an accompanying powerful thrust, to send the piston 25 down to its position 25', thereby to subdivide the lemon 29 into eight slices of uniform size without loss of juice and to deposit all said slices gently on the table 15. By a like upward movement of the hand-lever 35, all parts of the appliance are returned to the positions shown.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A device for subdividing into segments a fruit article, as a lemon, by slicing said article along lines radiating from a line passing substantially centrally through said fruit article comprising, an elongated vertical frame, clamping means carried at the base of frame to affix the same to a horizontal support, a cup member fixed to said frame intermediate the height thereof and opening upwardly parallel therewith, a plurality of radially spaced knives upwardly disposed in said cup and curvilinearly extended to form a seat in said cup for the fruit article, a substantially U-shaped bracket affixed to the upper extremity of said frame and extending horizontally above said cup, a pinion rotatably carried by said bracket, a handle pivoted to said bracket, a second pinion carried by the pivot common to said handle and in rigid engagement therewith, said second pinion having operable connection with said first named pinion, a rack in slidable engagement with said frame longitudinally thereof, said rack having meshing operable engagement with the said first named pinion, a pair of parallel spaced arms secured to the lower end of said rack in horizontal disposition above said cup, a transverse plate joining said arms intermediate their length, an elongated piston rotatably suspended intermediate the extremities of said arms in telescopic alignment above said cup, means in said piston for clearing the knives of said cup, a spring in tension between an intermediate point on said piston and said arms retaining said piston in a vertical condition abutting the transverse plate between said arms, and a handle on said piston for rocking the same outwardly.

HENRY PHILIP RIVET.

REFERENCES CITED

The following references are of record in the file of this patent:

UNITED STATES PATENTS

| Number | Name | Date |
|---|---|---|
| 80,010 | Reed | July 14, 1868 |
| 533,189 | Beuttel | Jan. 29, 1895 |
| 593,548 | Baumgarten et al. | Nov. 9, 1897 |
| 1,241,338 | Brown | Sept. 25, 1917 |
| 2,039,980 | Owen | Aug. 17, 1937 |
| 2,240,815 | Theodore | May 6, 1941 |
| 2,247,650 | Carlson | July 1, 1941 |